June 25, 1929.    E. A. JOHNSTON    1,718,786
MEANS FOR COUNTERBALANCING HARVESTER PLATFORMS
Filed Sept. 23, 1927    3 Sheets-Sheet 1
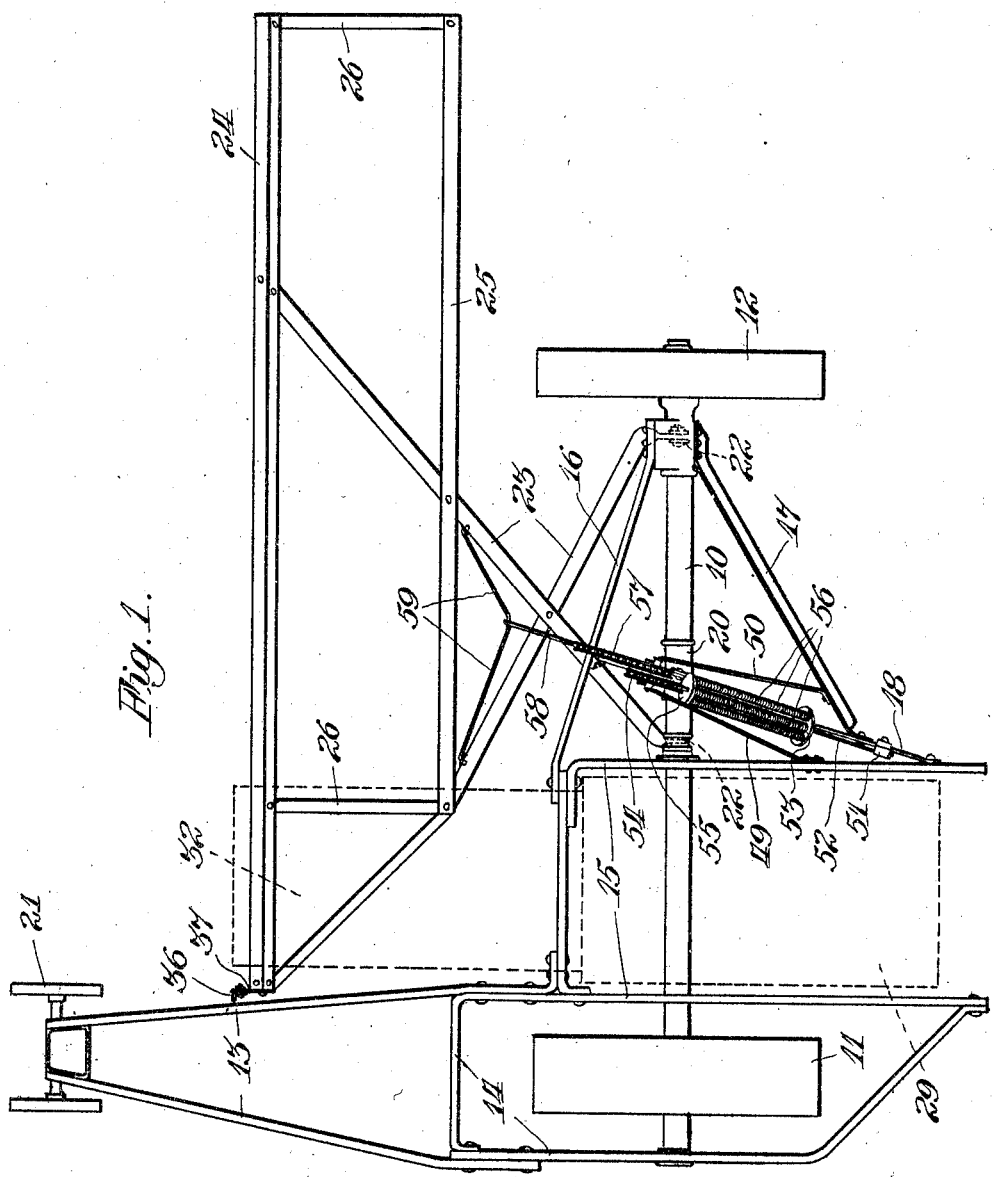

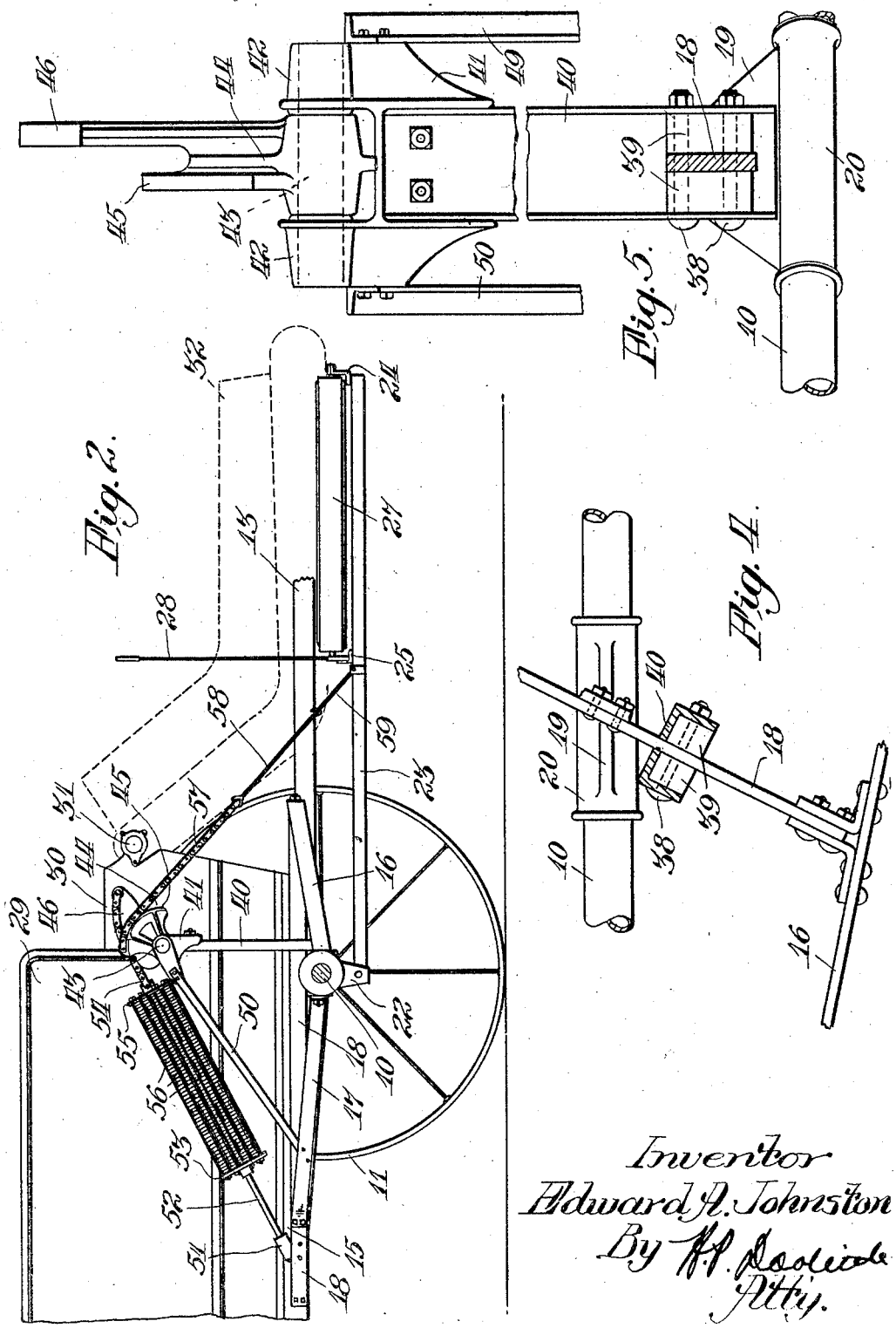

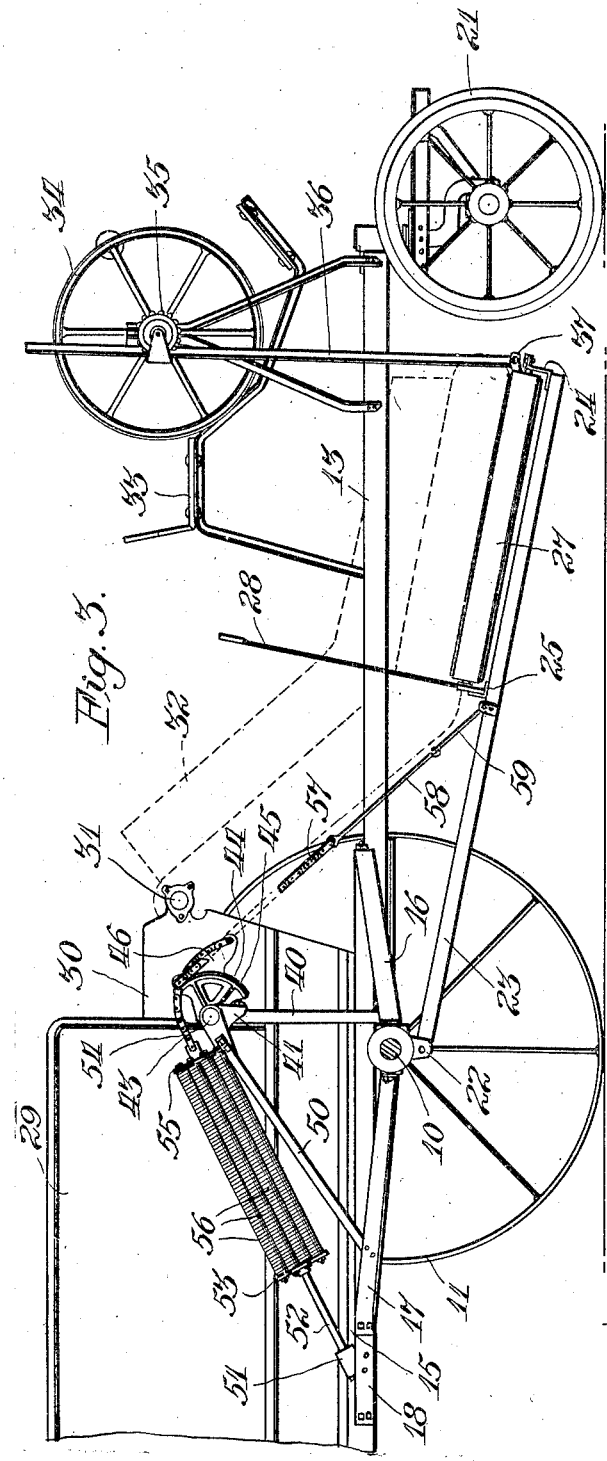
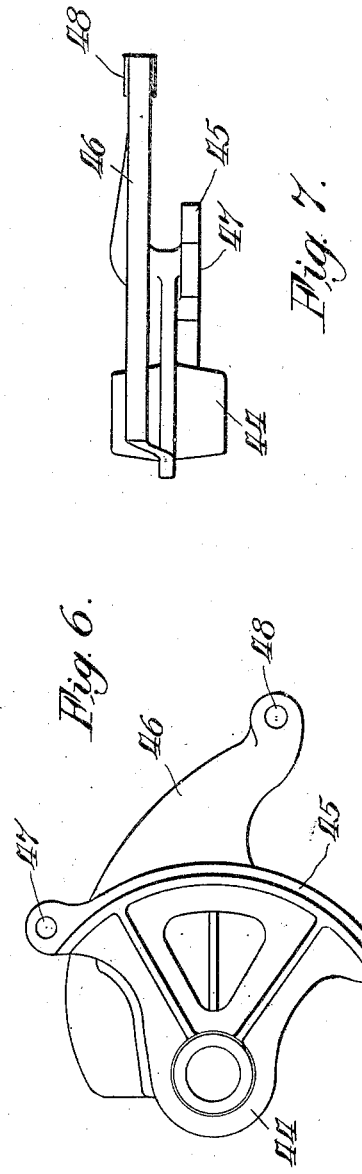

Patented June 25, 1929.

1,718,786

UNITED STATES PATENT OFFICE.

EDWARD A. JOHNSTON, OF CHICAGO, ILLINOIS, ASSIGNOR TO INTERNATIONAL HARVESTER COMPANY, A CORPORATION OF NEW JERSEY.

MEANS FOR COUNTERBALANCING HARVESTER PLATFORMS.

Application filed September 23, 1927. Serial No. 221,594.

The invention is in the art of harvesters, and relates especially to an improved means for counterbalancing the weight of the cutting and gathering platforms of such machines.

In the embodiment to be herein illustrated the same will be shown in association with the counterbalanced platform of a harvester thresher. These machines as standard in the art comprise a wheel and axle carried main frame which supports a thresher part at the stubbleward end of the axle, while the grainward end of the axle has pivotally connected thereto a supplementary rocking frame for supporting in offset relationship, the harvester part or platform. These platforms are vertically adjustable by any form of manual control means about the axle as an axis, and as they are very heavy some form of assisting or counterbalance means must be provided to overcome the weight thereof. Such means in the past has taken the form of offset counter-weights or heavy springs. Weights are satisfactory but cumbersome and necessitate the use of bulky supporting structure. Springs have an inherent deficiency in that their force decreases as the load is lifted; in other words the tension of the spring decreases as the load or platform is lifted, and vice versa the tension increases as the spring is stretched as the load or platform is dropped. It is highly desirable that such springs always exert a uniform pull regardless of the position of the platform up or down.

With this problem presented, it is the primary object of this invention to provide a novel compensating means of simple and cheap structure which will overcome, automatically, the inherent deficiency in counterbalancing springs, whereby they will always, regardless of the position of the load, exert a uniform pull; and, lastly, through the medium of such a compensated counterbalance, generally to improve the structure and operation of harvesting or other machines, and particularly harvester threshers.

In the harvester thresher embodiment herein to be illustrated these desirable objects are accomplished in the provision of a battery of springs anchored on the main frame rearwardly of the axis or axle about which the platform is raised and lowered, the other end of the spring battery being connected by chains or links to the platform forwardly of the axle, there being a rocking bracket on the axle, or on the frame thereabove, comprising a concentric portion and an eccentric portion cooperating with the described springs and connections in a manner to compensate for the tendency to varying spring tension by making the pull uniform throughout the range of movement of the cutting and gathering platform.

Reference is now to be made to the accompanying sheets of drawings wherein one embodiment which the invention may assume in practice is shown, and wherein:

Figure 1 is a general plan view of a harvester thresher organization embodying the improved compensated, spring counterbalance structure;

Figure 2 is a side elevation of the structure shown in Figure 1 with the platform in its extreme high adjusted position;

Figure 3 is similar to Figure 2 except that the platform is shown in its extreme low adjusted position;

Figure 4 is an enlarged, detail plan view showing a form of frame mounting for the improved compensating means;

Figure 5 is an enlarged front elevational view of the compensating means, per se, and its mounting on the frame; and Figures 6 and 7 are side elevational and top plan views, respectively, of the rocking bracket comprising the compensating means.

The harvester thresher shown for the purpose of illustrating the invention has a main, laterally extending axle 10 mounted in a main wheel 11 and a grain wheel 12, said axle rigidly carrying, in any approved manner, the main frame comprising an A-part 13 forwardly of the main wheel 11, a rectangular part 14 surrounding said main wheel, a second rectangular part 15 grainwardly of the part 14, and lateral diagonal braces 16 and 17, one forwardly of and the other rearwardly of the axle. These frame members 16 and 17 are joined by a substantially longitudinal frame member 18 (see Figures 1 and 4) which intermediately of its ends is bolted to a web 19 on a sleeve 20 drive fitted around the axle 10. (See also Figure 5.) The forward end of the A part 13 of the main frame is supported on a steering pilot, wheel truck 21, as is usual in these machines.

Grainwardly of the frame part 15, the axle 10 is provided with a pair of spaced, depending brackets 22, to which are pivotally connected a pair of diagonally and forwardly extending supplementary frame members 23, which cross each other, as shown best in Figure 1. At their front ends, these members 23 are connected by the usual transverse Z-bar 24 and rearwardly thereof these members carry the usual transverse angle bar 25. End pieces 26 complete the rectangular frame which supports the harvester platform indicated at 27. A backboard 28 extends vertically from the rear angle bar 25, as shown.

Going back now to the stubbleward side of the machine, it will be seen that the main frame part 15 rigidly supports a thresher housing 29, and forwardly thereof is the cylinder housing 30. This housing 30 is provided with a transverse shaft 31 from which is pivotally hung a feeder housing 32; said feeder housing depending angularly downwardly and forwardly, with its front end loosely and slidably resting on the stubbleward end of the platform supporting frame. As is usual in this art, it will be understood that the harvester platform receives the cut grain and a conveyer thereon moves the grain into the feeder housing which contains a feeder for advancing the grain into the cylinder housing 30 to be threshed.

As the harvester thresher in traveling across a field will frequently encounter grain of varying height, it becomes necessary to provide means for vertically adjusting the gathering platform to take care of these varying conditions. Accordingly on the A frame 13 adjacent a seat 33 a tiller wheel type of lift has been mounted, which comprises a wheel 34, with a gear 35 in mesh with holes in a lift member 36, said member 36 extending downwardly and being connected to a short arm 37 made fast to the stubbleward end of the Z-bar 24. As the platform is offset forwardly of the axle 10, and as the lifting force is applied to the extreme stubbleward end of the platform frame, some means must be provided for assisting the lift action and for counterbalancing the offset weight of the platform. Such means usually have been in the form of counter-weights, but, as they necessitate the employment of bulky supporting structure, the tendency is to use heavy springs for this purpose.

But a tensioning spring when used for this purpose has an inherent defect in that it cannot exert a uniform force in the various up and down positions of the platform. As has been said, the pull decreases with a decreasing tension, and increases with an increased tension. Obviously, then, it would be a great advantage to provide some means which will compensate for the varying tension pull in this connection in accordance with the varying stretch of the spring, and thus maintain, in all conditions of stretch or tension in the spring, a uniform pull. It is the purpose of this invention to provide such compensating means for a spring counterbalance which will keep the spring tension uniform. This mechanism and its supporting means will next be described.

The frame member 18 (see Figures 4 and 5), just forwardly of the axle 10, has secured thereto by bolts 38 and blocks 39, an upright channeled post 40, which at its upper end carries a bifurcated bracket 41 formed with transversely alined journals 42. These journals rockably receive a short shaft 43 which carries fast thereon, in any approved manner, a bracket 44 formed with an integral concentric portion 45 and an integral eccentric portion 46. (See Figures 6 and 7.) The upper or rear end of the concentric portion is formed with an eye 47, and the forward portion of the eccentric portion 46 is formed with an eye 48. A pair of braces 49 and 50 is secured to opposite sides of the bracket 41 and respectively to the frame 15 and diagonal brace 17 at points substantially to the rear of the axle 10, as shown in Figure 1. The rear end of the frame member 18 carries an anchor member 51 in which is adjustably fitted in any suitable manner one end of a rod 52, its other end being securely fitted into a plate 53. A short length of chain 54 is anchored at one end in the eye 48 of the eccentric part 46 of the rock bracket 44, and at its other end the chain 54 is anchored to another plate 55, said chain being trained over the eccentric in the manner illustrated. The plates 53 and 55 are connected by a battery of heavy, initially tensioned coil springs 56.

A similar, though slightly longer length of chain 57 is anchored at one end in the eye 47 of the part 45 and is trained over the concentric portion thereof in the manner shown. At its other end the chain is connected to a rod 58, which rod in turn is connected to a bail 59, the legs of which are respectively anchored to the crossed supplementary frame members 23 just rearwardly of the platform, as best shown in Figure 1.

The mode of operation of the harvester thresher is conventional. The platform receives the cut grain, and a conveyer apron thereon moves said cut grain into the feeder housing 32, in which is arranged a feed conveyer for directing the grain into the cylinder housing 30 from whence it passes into and through the housing 29 for separation.

The cutting and gathering platform is adjustable up and down by the tiller wheel 34 and its connections, to regulate the height of cut. As the offset weight of the platform is very great, the battery of springs 56 is provided to serve as a counterbalance and assist in the vertical adjustment of the platform. To make for uniformity in the tension of these springs, regardless of the position of the platform, the compensating rock bracket 44 is interposed in the connection between the springs and the platform. This bracket has a concentric portion connected to the platform and an eccentric arm or lever portion connected to the anchored battery of tensioned springs 56. The two bracket portions, of course, are integral, or at least so secured together that they will rock as one piece. It can easily be seen now that, when the platform is down, the springs 56 are stretched and under tension. Thus, when adjustment of the platform upwardly is begun the spring tension pull counterbalances the platform weight and assists the tiller wheel structure in lifting it. As the platform comes up, the eccentric arm portion 46 of the rock bracket also moves up and in so doing acts to maintain the stretch and tension in the springs whereby the pull remains uniform and constant. Thus, the normal tendency in the springs to lose their tension and stretch with a rising platform is compensated for. It can now be seen that the springs must act with a substantially uniform tension in all positions of adjustment of the platform. In practice the rock bracket will be located substantially above the axle 10 so that its down thrust will be best absorbed.

It is the intention to cover all changes and modifications which do not materially depart from the spirit and scope of the invention as is indicated in the appended claims.

What is claimed is:

1. The combination with a harvester having a vertically adjustable member and means for adjusting the same, of a tensioned resilient counterbalance for said member, and rockable means for automatically maintaining said counterbalance under uniform tension throughout the range of adjustment of the member.

2. The combination with a harvester having a main frame and a supplementary vertically adjustable frame and means for adjusting the same, of a tensioned counterbalance anchored at one end to the main frame and connected at its other end to the supplementary frame, and compensating means included in the counterbalance for maintaining the tension of the counterbalance substantially uniform in all positions of adjustment of the supplementary frame.

3. In a harvester having a vertically adjustable platform, means for adjusting the platform, resilient means for assisting the adjusting means and for counterbalancing the weight of the platform, and means for automatically maintaining the tension of the resilient means constant in all positions of adjustment of the platform.

4. In a harvester having a frame including an axle, a vertically adjustable platform pivotally connected thereto, means for adjusting the platform, a tensioned spring counterbalance anchored on the frame and connected to the platform for assisting the adjusting means and for counterbalancing the weight of the platform, and rockable means for automatically maintaining the tension of the counterbalance uniform in all positions of adjustment of the platform.

5. In a harvester thresher having a frame and an axle, a harvester part offset from the frame and pivotally connected to said axle, means for vertically adjusting said harvester part, resilient tensioned means for assisting said adjusting means and for counterbalancing the weight of the harvester part in its vertical movement, and means for maintaining the tension of said resilient means uniform in all vertical positions of the harvester part.

6. In a harvester thresher having a frame and an axle, a harvester part offset from the frame and pivotally connected to said axle, means for vertically adjusting said harvester part, resilient tensioned means for assisting said adjusting means and for counterbalancing the weight of the harvester part in its vertical movement, and rockable means carried by the frame and connected with the resilient means to maintain the tension of said means uniform in all positions of adjustment of the harvester part.

7. In a harvester thresher having a frame, a harvester part pivotally connected thereto, means for vertically adjusting the harvester part, a rockable member on the frame including a concentric and an eccentric portion, a spring counterbalance anchored to the frame and connected to the eccentric portion of the rockable member, and a connection from the concentric portion of said member to the harvester part.

8. In a harvester thresher having a frame, a harvester part pivotally connected thereto, means for vertically adjusting the harvester part, a rockable member on the frame including a concentric and an eccentric portion, a spring counterbalance anchored to the frame and having a flexible connection to the eccentric portion of the rockable member, and a flexible connection from the concentric portion of said member to the harvester part.

9. In a harvester thresher having a frame, a harvester part pivotally connected thereto, means for vertically adjusting said harvester part, a tensioned spring counterbalance mechanism, a post connected to the frame, and a rockable member connected to the post and having connections with the counterbalance and the harvester part for maintaining a substantially uniform tension on the counterbalance in all positions of the harvester part.

In testimony whereof I affix my signature.

EDWARD A. JOHNSTON.